US012434215B2

(12) United States Patent
Nishikawa et al.

(10) Patent No.: US 12,434,215 B2
(45) Date of Patent: Oct. 7, 2025

(54) MICROCAPSULE PRODUCTION METHOD

(71) Applicant: MORISHITA JINTAN CO., LTD., Osaka (JP)

(72) Inventors: Takehiro Nishikawa, Hirakata (JP); Taku Hashimoto, Hirakata (JP); Hideo Sugimoto, Hirakata (JP); Ai Nishibayashi, Hirakata (JP)

(73) Assignee: MORISHITA JINTAN CO., LTD., Osaka (JP)

( * ) Notice: Subject to any disclaimer, the term of this patent is extended or adjusted under 35 U.S.C. 154(b) by 311 days.

(21) Appl. No.: 18/006,650

(22) PCT Filed: Jul. 28, 2021

(86) PCT No.: PCT/JP2021/027949
§ 371 (c)(1),
(2) Date: Jan. 24, 2023

(87) PCT Pub. No.: WO2022/025133
PCT Pub. Date: Feb. 3, 2022

(65) Prior Publication Data
US 2023/0285923 A1   Sep. 14, 2023

(30) Foreign Application Priority Data
Jul. 31, 2020 (JP) ................................. 2020-130794

(51) Int. Cl.
*B01J 13/16* (2006.01)
(52) U.S. Cl.
CPC .................... *B01J 13/16* (2013.01)
(58) Field of Classification Search
CPC ............. A61J 3/07; B01J 13/16; B01J 13/185
USPC ....................... 425/5; 264/4.1, 4.7
See application file for complete search history.

(56) References Cited

U.S. PATENT DOCUMENTS

| | | | |
|---|---|---|---|
| 4,495,509 A * | 1/1985 | Chao | B41M 5/165 427/213.34 |
| 4,599,271 A | 7/1986 | Chao | |
| 8,119,214 B2 * | 2/2012 | Schwantes | B01J 13/02 264/4.1 |
| 2004/0195711 A1 * | 10/2004 | Hayashi | B01J 13/14 264/4.1 |
| 2011/0230390 A1 | 9/2011 | Ouali et al. | |
| 2013/0095158 A1 | 4/2013 | Denuell et al. | |
| 2015/0231588 A1 * | 8/2015 | Moore | C08K 3/346 523/400 |
| 2020/0115536 A1 | 4/2020 | Dulgar et al. | |

FOREIGN PATENT DOCUMENTS

| | | |
|---|---|---|
| JP | S59-228931 A | 12/1984 |
| JP | H02-258052 A | 10/1990 |
| JP | H06-018636 B2 | 3/1994 |
| JP | 2010-082527 A | 4/2010 |
| JP | 2012-512933 A | 6/2012 |
| JP | 2012-140600 A | 7/2012 |
| JP | 2013-537472 A | 10/2013 |
| WO | 2007/032225 A1 | 3/2007 |
| WO | 2018/162455 A1 | 9/2018 |

OTHER PUBLICATIONS

International Preliminary Report on Patentability of PCT/JP2021/027949, Feb. 9, 2023, 5 pages.
International Search Report of PCT/JP2021/027949, Oct. 26, 2021, 2 pages.
Extended European Search Report issued in European Patent Application No. 21848585.2, Jul. 15, 2024 (7 pages).

* cited by examiner

Primary Examiner — Alison L Hindenlang
Assistant Examiner — Debjani Roy
(74) Attorney, Agent, or Firm — HSML P.C.

(57) ABSTRACT

The present invention easily provides microcapsules by using a production method according to a more efficient and reliable interfacial polymerization method even when it is difficult to produce microcapsules by an interfacial polymerization method by adding a solution of a film-forming substance. Specifically, the present invention provides a method for producing microcapsules using two types of emulsion particles differing in size, the method comprising:
an emulsion-forming step of separately forming two types of emulsions (1) and (2) whose continuous phases are common, wherein emulsion particles (1) of the emulsion (1) comprises one of two types of monomers which react with each other to form a film and emulsion particles (2) of the emulsion (2) comprises the other monomer; and
a microcapsule-forming step of mixing and interfacial-polymerizing the emulsion (1) and the emulsion (2), wherein
the emulsion particles (1) of the emulsion (1) have an average particle size (R) of 0.1 to 300 μm,
the emulsion particles (2) of the emulsion (2) have an average particle size (r) of 0.01 to 30 μm, and
$r/R \leq 0.1$ is satisfied.

9 Claims, No Drawings

MICROCAPSULE PRODUCTION METHOD

TECHNICAL FIELD

The present invention relates to a method for producing a microcapsule using two types of emulsion particles differing in size.

BACKGROUND ART

Microcapsules in which a core agent is covered with a shell are used in various fields. For example, water-containing microcapsules containing water as a core substance are used as a cold storage heat medium in a heat exchanger or the like by utilizing latent heat of water. Thermally expandable microcapsules having a hydrocarbon or the like as a core material are used in a wide range of applications as a designability imparting agent and a weight reducing agent. In addition, thermally expandable microcapsules are blended in materials such as wallpaper, and are also used in coating materials and the like for the purpose of weight reduction. On the other hand, in an epoxy resin composition for use in such applications as an adhesive, a sealing agent, and a coating agent, in order to mix an epoxy resin with a curing agent or a curing accelerator for advancing the curing of the epoxy resin to form one stable liquid, microcapsules in which a curing agent or a curing accelerator as a core agent is coated with a shell and which has latent properties are in use.

However, as compared with the case where the core agent is hydrophobic, development of microcapsules in which the core agent is a water-soluble substance such as water or development of a method for producing the microcapsules has been relatively delayed. In addition, even when the core agent is hydrophobic, there is a problem that microcapsules capable of stably holding the contents by reacting with the aqueous phase is hard to be obtained.

As a method for producing microcapsules in which the core agent is water-soluble, it is known that, as described in JP-A-2-258052 (Patent Literature 1), an O/W emulsion is formed using hexane, which is an organic solvent, as the core agent, an aqueous solution containing hexamethylenediamine for film formation is added and then heated to volatilize hexane and form a film on the surfaces of particles, and microcapsules with a high moisture content rate are thereby afforded. This stands on the background that storage stability cannot be maintained when a water-soluble substance is originally used as the core agent, but it has been a production process that requires an unsafe and complicated operation such as a step of volatilizing an organic solvent.

On the other hand, in JP-A-2012-140600 (Patent Literature 2), a microcapsule is obtained by using a water-soluble substance comprising a water-soluble radical polymerization initiator as a core agent, and a film is then formed on the surface of the core by interfacial polymerization. However, this production process requires a two-step reaction in order to obtain target microcapsules, and this is not necessarily a simple production process.

In addition, JP-B-6-018636 (Patent Literature 3) describes a method for preparing microcapsules by mixing a first O/W type organic emulsion in water including a solution comprising a polyisocyanate as a first oil-soluble reactant as an oil phase and a solution comprising a surfactant as an aqueous phase with a second O/W type organic emulsion in water including a solution comprising an amine as a second oil-soluble reactant as an oil phase and a solution comprising a surfactant as an aqueous phase. However, in such a method, in the preparation of the emulsion of the polyisocyanate and the aqueous phase, there is apprehension that a side reaction other than the film formation is caused by a reaction between water and an isocyanate, and it is not clear how reaction components can be exchanged through collision between droplets. In addition, it is necessary to spend 4 hours to 24 hours as a reaction time, and a production method by which high-quality microcapsules can be easily obtained has been demanded.

It is desired to efficiently obtain microcapsules which are capable of encapsulating various beneficial materials as well as tough, leak-reduced, and dense. It is also desired to obtain microcapsules which are capable of encapsulating an epoxy resin curing agent as well as tough and superior in storage stability.

CITATIONS LIST

Patent Literature

Patent Literature 1: JP-A-2-258052
Patent Literature 2: JP-A-2012-140600
Patent Literature 3: JP-B-6-018636

SUMMARY OF INVENTION

Technical Problems

An object of the present invention is to easily provide microcapsules by using a production method according to a more efficient and reliable interfacial polymerization method even when it is difficult to produce microcapsules by an interfacial polymerization method by adding a solution of a film-forming substance.

Solutions to Problems

The present invention provides the following embodiments.

[1] A method for producing microcapsules using two types of emulsion particles differing in size, the method including:
  an emulsion-forming step of separately forming two types of emulsions (1) and (2) whose continuous phases are common, wherein emulsion particles (1) of the emulsion (1) comprises one of two types of monomers which react with each other to form a film and emulsion particles (2) of the emulsion (2) comprises the other monomer; and
  a microcapsule-forming step of mixing and interfacial-polymerizing the emulsion (1) and the emulsion (2), wherein
  the emulsion particles (1) of the emulsion (1) have an average particle size (R) of 0.1 to 300 μm,
  the emulsion particles (2) of the emulsion (2) have an average particle size (r) of 0.01 to 30 μm, and
  $r/R \leq 0.1$ is satisfied.

[2] The method for producing microcapsules according to [1], wherein the emulsion particles (1) have an average particle size (R) of 0.1 to 100 μm, the emulsion particles (2) have an average particle size (r) of 0.01 to 10 μm, and $r/R \leq 0.1$ is satisfied.

[3] The method for producing microcapsules according to [1] or [2], wherein the average particle size (R) of the emulsion particles (1) or the average particle size (r) of the emulsion particles (2) is adjusted into a prescribed range, after the emulsion-forming step.

[4] The method for producing microcapsules according to any one of [1] to [3], wherein an increase rate of the average particle size (R) during the microcapsule-forming step is less than 1.3 times.

[5] The method for producing microcapsules according to any one of [1] to [4], wherein the continuous phase is liquid paraffin or silicone oil.

[6] The method for producing microcapsules according to any one of [1] to [5], wherein one of two types of monomers that react with each other to form a film is an isocyanate compound having two or more isocyanate groups in one molecule, and the other monomer is a monomer selected from the group consisting of a polyamine compound having two or more amino groups in one molecule, a polyhydroxy compound having two or more hydroxyl groups in one molecule, and a combination thereof.

[7] The method for producing microcapsules according to any one of [1] to [6], wherein a core agent of the microcapsules is water, a water-soluble heat storage material, a thermally expandable hydrocarbon or a fluoride thereof, an epoxy resin curing agent, or an epoxy resin curing accelerator.

[8] The method for producing microcapsules according to any one of [1] to [7], wherein the epoxy resin curing agent comprises a polyisocyanate, a bisphenol A type epoxy resin, and an imidazole compound.

[9] The method for producing microcapsules according to any one of [1] to [8], wherein the epoxy resin curing agent is a liquid mixture prepared by mixing a polyisocyanate, a bisphenol A type epoxy resin, and an imidazole compound in advance and then heating and stirring the mixture.

[10] The method for producing microcapsules according to any one of [1] to [9], wherein the reaction time in the microcapsule-forming step is 6 hours or less.

Advantageous Effects of Invention

According to the present invention, even when it is difficult to produce stable microcapsules by an interfacial polymerization method through the addition of a solution of a substance having a film-forming material or a polymerization reactant, microcapsules having an arbitrary particle size can be easily obtained with high efficiency by the interfacial polymerization method using the emulsions of the present invention. In addition, it is possible to provide a capsule that maintains a high water content rate when encapsulating an aqueous substance as a core substance or that is superior in pressure resistance when encapsulating a hydrophobic substance as a core substance.

DESCRIPTION OF EMBODIMENTS

<Definition of Terms>

In the present description, "continuous phases are common" means a case where "the continuous phases forming emulsions are the same or can be dissolved in each other", and is a concept including a case where exactly the same continuous phase is used as well as a case where the continuous phases are compositionally different but are dissolved in each other.

The present invention provides a method for producing microcapsules using two types of emulsion particles differing in size, the method including:

an emulsion-forming step of separately forming two types of emulsions (1) and (2) whose continuous phases are common, wherein emulsion particles (1) of the emulsion (1) comprises one of two types of monomers which react with each other to form a film and emulsion particles (2) of the emulsion (2) comprises the other monomer; and a microcapsule-forming step of mixing and interfacial-polymerizing the emulsion (1) and the emulsion (2), wherein the emulsion particles (1) of the emulsion (1) have an average particle size (R) of 0.1 to 300 μm, the emulsion particles (2) of the emulsion (2) have an average particle size (r) of 0.01 to 30 μm, and $r/R \leq 0.1$ is satisfied.

In the present invention, microcapsules are produced using two types of emulsion particles differing in size. The two types of emulsions are separately formed, and it is necessary that the emulsion particles (dispersed phase) (1) of the emulsion (1) have an average particle size (R) of 0.1 to 300 μm, the emulsion particles (dispersed phase) (2) of the emulsion (2) have an average particle size (r) of 0.01 to 20 μm, and $r/R \leq 0.1$ is satisfied. Specifically, the average particle size (R) of the emulsion particles (1) of the emulsion (1) is larger and the average particle size (r) of the emulsion particles (2) of the emulsion (2) is 1/10 times smaller. In the step of forming microcapsules, both the emulsions are mixed and interfacially polymerized, that is, made to undergo a polymerization reaction, forming capsules. It appears that small emulsion particles (2) adhere around large emulsion particles (1) and a polymerization reaction occurs at the interface to form a film and form microcapsules.

Since the emulsion (1) contains a core agent of microcapsules, water is used as the core agent when water is encapsulated, or a water-soluble heat storage material that stores or radiates heat through phase change is used as the core agent when microcapsules for heat storage material applications are formed. Specifically, one material or two or more materials selected from the group consisting of sugars, sugar alcohols, inorganic salts, and inorganic salt hydrates are used as the water-soluble heat storage material.

When the core agent is aqueous, a gelling agent that is dissolved in an aqueous solvent to be gelled, a dispersion stabilizer for stabilizing the core agent, and the like are appropriately selected as an additive for effectively emulsifying the core agent. Examples of the gelling agent include polyvinyl alcohol, polyvinyl phenol, polyvinyl pyrrolidone, polyacrylamide, polyacrylic acid, polymethacrylic acid, polyethylene glycol, methyl cellulose, hydroxypropyl cellulose, agar, gelatin, and sodium alginate. These may be used singly, or two or more of them may be used in combination. Examples of the dispersion stabilizer include silica, calcium phosphate, magnesium hydroxide, aluminum hydroxide, ferric hydroxide, barium sulfate, calcium sulfate, sodium sulfate, calcium oxalate, calcium carbonate, barium carbonate, and magnesium carbonate.

In addition, in the case of producing microcapsules for a thermally expanding agent application, examples of the core agent include linear aliphatic hydrocarbons having 3 to 8 carbon atoms, branched aliphatic hydrocarbons having 3 to 8 carbon atoms, cyclic aliphatic hydrocarbons having 3 to 8 carbon atoms, ether compounds having a hydrocarbon group having 2 to 8 carbon atoms, and fluorides in which part of the hydrogen atoms of those hydrocarbon groups is substituted with a fluorine atom. More specifically, examples thereof include propane, cyclopropane, butane, cyclobutane, isobutane, pentane, cyclopentane, neopentane, isopentane, hexane, cyclohexane, 2-methylpentane, 2,2-dimethylbutane, heptane, cycloheptane, octane, cyclooctane, methylheptanes, trimethylpentanes, and hydrofluoroethers such as $C_3F_7OCH_3$, $C_4F_9OCH_3$, and $C_4F_9OC_2H_5$. These are used singly or in the form of a mixture of more than one thereof. Furthermore, peroxides such as dialkyl peroxides, diacyl peroxides, peroxyacid esters, and peroxydicarbonate; and azo compounds can also be selected as an expanding agent.

As the core agent of the microcapsules of the present invention, it is also possible to use a curing agent or a curing accelerator for advancing the curing of an epoxy resin. Specifically, examples of the curing agent or curing accelerator of the epoxy resin include imidazole compounds and amine compounds. Examples of the imidazole compounds include 2-methylimidazole, 2-phenylimidazole, 2-ethyl-4-methylimidazole, 1,2-dimethylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-dodecyl-2-methyl-3-benzylimidazolium chloride, 2-undecylimidazole, 2-heptadecylimidazole, and 1-cyanoethylimidazole. Examples of the amine compounds include ethylenediamine, butanediamine, hexamethylenediamine, octanediamine, diethylenetriamine, triethylenediamine, triethylenetriamine, malonic acid dihydrazide, 1,3-bis(hydrazinocarbonoethyl)-5-isopropylhydantoin, 1,8-diazabicyclo[5.4.0]undec-7-ene, 2,4,6-tris(dimethylamino)phenol, and 2-dimethylaminophenol. These imidazole compounds and amine compounds may be used singly or two or more thereof in combination.

The imidazole compounds or the amine compounds can also be used in the form of an imidazole adduct of an epoxy resin or an amine adduct of an epoxy resin. Examples of the adduct include a compound obtained through a reaction of an epoxy resin with an imidazole compound or with an amine compound, and the adduct is preferably an imidazole adduct of an epoxy resin composed of an imidazole compound and an epoxy resin. The solvent to be used as necessary in the production of the imidazole adduct is not particularly limited, but examples thereof include hydrocarbons such as benzene, toluene, xylene, cyclohexane, mineral spirit, and naphtha, ketones such as acetone, methyl ethyl ketone, and methyl isobutyl ketone, and esters such as ethyl acetate, n-butyl acetate, and propylene glycol monomethyl ether acetate, and these solvents may be used in combination. The addition amount of the epoxy resin to the imidazole compound is preferably within a range of 1:0.2 to 1:5 based on the active hydrogen equivalent (amine value) of the imidazole compound. When the equivalent ratio is smaller than 1:0.2, that is, when the addition amount of the epoxy resin is small, the fluidity of the imidazole compound increases, so that it becomes unsuitable for long-term storage stability. On the other hand, when the equivalent ratio is more than 1:5, that is, when the addition amount of the epoxy resin increases, the viscosity increases and it becomes difficult to form small droplets in the following emulsification step, so that it becomes difficult to obtain microcapsules having a small particle size. Therefore, the addition amount of the epoxy resin to the imidazole compound is preferably 1:0.3 to 1:1 based on the active hydrogen equivalent (amine value) of the imidazole compound.

The shell (film) of the microcapsule to be produced in the present invention is formed from two monomers that react with each other to form a film. In the present invention, preferable examples are a polyisocyanate and a polyhydroxy compound (to form a polyurethane film) or polyamine compound (to form a polyurea film) that reacts with the polyisocyanate to form a film.

Examples of the polyisocyanate include aliphatic polyisocyanates and aromatic polyisocyanates. Examples of the aliphatic polyisocyanates include trimethylene diisocyanate, hexamethylene diisocyanate, propylene-1,2-diisocyanate, butylene-1,2-diisocyanate, cyclohexylene-1,2-diisocyanate, cyclohexylene-1,3-diisocyanate, cyclohexylene-1,4-diisocyanate, dicyclohexylmethane-4,4'-diisocyanate, 1,4-bis(isocyanatomethyl)cyclohexane, 1,3-bis(isocyanatomethyl)cyclohexane, isophorone diisocyanate, lysine diisocyanate, and hydrogenated xylylene diisocyanate. Examples of the aromatic polyisocyanates include m-phenylene diisocyanate, p-phenylene diisocyanate, 2,6-tolylene diisocyanate, 2,4-tolylene diisocyanate, naphthalene-1,4-diisocyanate, diphenylmethane-4,4'-diisocyanate, 3,3'-dimethoxy-biphenyl diisocyanate, 3,3'-dimethyldiphenylmethane-4,4'-diisocyanate, xylylene-1,4-diisocyanate, xylylene-1,3-diisocyanate, 4-chloroxylylene-1,3-diisocyanate, 2-methylxylylene-1,3-diisocyanate, 4,4'-diphenylpropane diisocyanate, and 2,2-bis(4-isocyanatophenyl)hexafluoropropane. Although difunctional diisocyanate compounds are enumerated as examples above, trifunctional triisocyanate compounds and tetrafunctional tetraisocyanate compounds analogized from those compounds may be employed.

Examples of a condensate, polymer, or adduct formed using an isocyanate compound include a biuret form or isocyanurate form which is a trimer of the difunctional isocyanate compound, a compound multifunctionalized in the form of an adduct of a polyol such as trimethylolpropane and a difunctional isocyanate compound, a formalin condensate of benzene isocyanate, a polymer of an isocyanate compound having a polymerizable group such as methacryloyloxyethyl isocyanate, and lysine triisocyanate.

Such polyisocyanate compounds are described in "Polyurethane Resin Handbook" (edited by Keiji Iwata, published by The Nikkan Kogyo Shimbun, Ltd. (1987)).

Among the above, it is preferable that the shells of the microcapsules contain a polymer of tri- or higher functional isocyanate. Examples of the tri- or higher functional isocyanate include tri- or higher functional aromatic isocyanate compounds and tri- or higher functional aliphatic isocyanate compounds. As examples of the tri- or higher functional isocyanate compound, an isocyanate compound (adduct type) tri- or higher functionalized in the form of an adduct of a difunctional isocyanate compound (compound having two isocyanate groups in the molecule) and a compound having three or more active hydrogen groups in the molecule (for example, polyol, polyamine, polythiol, or the like having tri- or higher functional groups) and a trimer (biuret type or isocyanurate type) of a difunctional isocyanate compound are also preferable. Specific examples of the tri- or higher functional isocyanate compound may include adducts of 2,6-tolylene diisocyanate, 2,4-tolylene diisocyanate, or hexamethylene diisocyanate and trimethylolpropane, a biuret form, and an isocyanurate form.

As the adduct type tri- or higher functional isocyanate compound, commercially available products on the market may be used, and examples of such commercially available products include TAKENATE (registered trademark) D-102, D-103, D-103H, D-103M2, P49-75S, D-110N, D-120N, D-140N, and D-160N (manufactured by Mitsui Chemicals, Inc.), DESMODUR (registered trademark) L75, UL57SP (manufactured by Sumika Bayer Urethane Co., Ltd.), CORONATE (registered trademark) HL, HX, and L (manufactured by Nippon Polyurethane Industry Co., Ltd.), P301-75E (manufactured by Asahi Kasei Corp.), and BURNOCK (registered trademark) D-750 (manufactured by DIC Corporation). As the isocyanurate type tri- or higher functional isocyanate compound, commercially available products on the market may be used, and examples thereof include TAKENATE (registered trademark) D-127N, D-131N, D-132N, D-170N, D-170HN, D-172N, D-177N, D-204, D-262, and STABiO (registered trademark) D-370N (manufactured by Mitsui Chemicals, Inc.), SUMIDUR N3300, DESMODUR (registered trademark) N3600, N3900, and Z4470BA (Sumika Bayer Urethane Co., Ltd.), CORONATE (registered trademark) HX, HK (manufactured by Nippon Polyurethane Industry Co., Ltd.), DURANATE (registered trademark) TPA-100, TKA-100, TSA-100, TSS-100, TLA-100, and TSE-100 (manufactured by Asahi Kasei Corp.). As the biuret type tri- or higher functional isocyanate compound, commercially available products on the market may be used, and examples thereof include TAKENATE (registered trademark) D-165N, NP1100 (manufactured by Mitsui Chemicals, Inc.), DESMODUR (registered trademark) N3200 (Sumika Bayer Urethane Co., Ltd.), and DURANATE (registered trademark) 24A-100 (manufactured by Asahi Kasei Corp.).

The polyisocyanates in the present invention may be used singly or two or more thereof may be used in combination.

The polyhydroxy compound preferably has no isocyanate group or no amino group, and more preferably has neither isocyanate group nor amino group. The number of the hydroxyl groups which the hydroxy compound has in one molecule is not particularly limited as long as it is 2 or more, but is preferably 2 to 6, more preferably 2 to 5, still more preferably 2 to 4, and particularly preferably 2 or 3.

Examples of the polyhydroxy compound include organic polyhydroxy compounds, and examples of the organic polyhydroxy compound include alkylene glycols such as ethylene glycol, propylene glycol, and 1,4-butanediol. The hydroxy compound to be used at the time of forming the polyurethane by polycondensation may be one compound or two or more compounds, and when two or more hydroxy compounds are used, the combination and the ratio thereof may be arbitrarily chosen.

In addition, a catalyst may be added in order to accelerate the reaction at the time of forming polyurethane. For example, a single catalyst such as 1,8-diazabicyclo[5.4.0]-7-undecene (DBU), 1,5-diazabicyclo[4.3.0]-5-nonene (DBN), or 1,4-diazabicyclo[2.2.2]octane (DABCO) may be used, or two or more catalysts may be mixed and used.

The polyamine compound may be a substance containing two or more amino groups. Examples thereof include ethylenediamine, propylenediamine, 1,4-diaminobutane, 1,5-diaminopentane, hexamethylenediamine, 1,8-diaminooctane, bis(2-aminoethyl)amine, tris(2-aminoethyl)amine, tris(3-aminopropyl)amine, bis(hexamethylene)triamine, diethylenetriamine, triethylenetetramine, tetraethylenepentamine, pentaethylenehexamine, N,N-bis(2-aminoethyl)-1,3-propanediamine, N,N'-bis(3-aminopropyl)ethylenediamine, 1,2-bis(2-aminoethoxy)ethane, 1,4-butanediol bis(3-aminopropyl) ether, and diethyleneglycol bis(3-aminopropyl) ether. Of them, at least one compound selected from among tris(2-aminoethyl)amine, bis(2-aminoethyl)amine, bis(hexamethylene)triamine, ethylenediamine, diethylenetriamine, triethylenetetramine, tetraethylenepentamine, pentaethylenehexamine, and hexamethylenediamine is more preferable. The polyamine compounds may be used singly or two or more thereof may be used in combination.

When the continuous phase of the emulsions of the present invention is an aqueous phase, the continuous phase may have a composition containing an aqueous medium and an emulsifier. The aqueous medium mentioned above is preferably water. The aqueous medium preferably accounts for 20% by mass to 80% by mass, preferably 30% by mass to 70% by mass, and more preferably 40% by mass to 60% by mass based on the total mass of the emulsion that is a mixture of the oil phase and the aqueous phase.

The emulsifiers include dispersants or surfactants or combinations thereof. Examples of the dispersants include polyvinyl alcohol and a modified product thereof (for example, anionic-modified polyvinyl alcohol), polyacrylic amide and derivatives thereof, an ethylene-vinyl acetate copolymer, a styrene-maleic anhydride copolymer, an ethylene-maleic anhydride copolymer, an isobutylene-maleic anhydride copolymer, polyvinyl pyrrolidone, an ethylene-acrylic acid copolymer, a vinyl acetate-acrylic acid copolymer, carboxymethyl cellulose, methyl cellulose, casein, gelatin, starch derivatives, gum arabic, and sodium alginate.

The surfactants include nonionic surfactants, anionic surfactants, cationic surfactants, and amphoteric surfactants. Surfactants may be used singly, or two or more thereof may be used in combination.

The nonionic surfactant is not particularly limited, and conventionally known nonionic surfactants can be used. Examples thereof include polyoxyethylene alkyl ether-based compounds, polyoxyethylene alkyl phenyl ether-based compounds, polyoxyethylene polystyryl phenyl ether-based compounds, polyoxyethylene polyoxypropylene alkyl ether-based compounds, glycerin fatty acid partial ester-based compounds, sorbitan fatty acid partial ester-based compounds, pentaerythritol fatty acid partial ester-based compounds, propylene glycol monofatty acid ester-based compounds, sucrose fatty acid partial ester-based compounds, polyoxyethylene sorbitan fatty acid partial ester-based compounds, polyoxyethylene sorbitol fatty acid partial ester-based compounds, polyethylene glycol fatty acid ester-based compounds, polyglycerin fatty acid partial ester-based compounds, polyoxyethylenated castor oil-based compounds, polyoxyethylene glycerin fatty acid partial ester-based compounds, fatty acid diethanolamide-based compounds, N,N-bis(2-hydroxyethyl)alkylamine-based compounds, polyoxyethylene alkylamines, triethanolamine fatty acid esters, trialkylamine oxides, polyethylene glycol, polyethylene glycol, and copolymers of polyethylene glycol and polypropylene glycol.

The anionic surfactant is not particularly limited, and conventionally known anionic surfactants can be used. Examples thereof include fatty acid salts, abietic acid salts, hydroxyalkane sulfonic acid salts, alkane sulfonic acid salts, dialkylsulfosuccinic acid ester salts, linear alkylbenzene sulfonic acid salts, branched alkylbenzene sulfonic acid salts, alkylnaphthalene sulfonic acid salts, alkylphenoxy polyoxyethylene propyl sulfonic acid salts, polyoxyethylene alkyl-sulfo-phenyl ether salts, N-methyl-N-oleyltaurine sodium salts, N-alkylsulfosuccinic acid monoamide disodium salts, petroleum sulfonic acid salts, sulfated tallowate oils, sulfuric acid ester salts of fatty acid alkyl esters, alkyl sulfuric acid ester salts, polyoxyethylene alkyl ether sulfuric acid ester salts, fatty acid monoglyceride sulfuric acid ester salts, polyoxyethylene alkyl phenyl ether sulfuric acid ester salts, polyoxyethylene styryl phenyl ether sulfuric acid ester salts, alkyl phosphoric acid ester salts, polyoxyethylene alkyl ether phosphoric acid ester salts, polyoxyethylene alkyl phenyl ether phosphoric acid ester salts, partially saponified products of styrene-maleic anhydride copolymers, partially saponified products of olefin-maleic anhydride copolymers, naphthalene sulfonate formalin condensates, salts of alkyl polyoxyalkylene sulfoalkyl ethers, and salts of alkenyl polyoxyalkylene sulfoalkyl ethers.

The cationic surfactant is not particularly limited, and conventionally known cationic surfactants can be used. Examples thereof include alkylamine salts, quaternary ammonium salts (for example, hexadecyltrimethylammonium chloride), polyoxyethylene alkylamine salts, and polyethylene polyamine derivatives.

The amphoteric surfactant is not particularly limited, and conventionally known amphoteric surfactants can be used. Examples thereof include carboxybetaine, aminocarboxylic acid, sulfobetaine, aminosulfate esters, and imidazoline.

The concentration of the emulsifier is preferably more than 0% by mass and 20% by mass or less, more preferably 0.005% by mass or more and 15% by mass or less, still more preferably 0.01% by mass or more and 12% by mass or less, and most preferably 1% by mass or more and 10% by mass or less, based on the total mass of the emulsion that is a mixture of an oil phase and an aqueous phase.

The aqueous phase may contain other components such as an ultraviolet absorber, an antioxidant, and a preservative, as necessary.

When the continuous phase of the present invention is an oil phase, components such as a solvent and/or an additive may be further contained.

Examples of the solvent include fatty acid ester-based compounds such as glyceryl tri(capryl-capric acid) and isopropyl myristate; aromatic hydrocarbons such as alkylnaphthalene-based compounds such as diisopropylnaphthalene, diarylalkane-based compounds such as 1-phenyl-1-xylylethane, alkylbiphenyl-based compounds such as isopropylbiphenyl, triarylmethane-based compounds, alkylbenzene-based compounds, benzylnaphthalene-based compounds, diarylalkylene-based compounds, and arylindane-based compounds; aliphatic hydrocarbon such as dibutyl phthalate, paraffin, and isoparaffin; silicone oil; natural animal and vegetable oils such as camellia oil, soybean oil, corn oil, cottonseed oil, rapeseed oil, olive oil, coconut oil, castor oil, and fish oil; and natural product high-boiling point fractions such as mineral oil.

The solvent may contain the surfactant described above. In addition, an additive such as an ultraviolet absorber, a light stabilizer, an antioxidant, a wax, and an odor inhibitor may be encapsulated in the microcapsules, as necessary.

The additive may be contained in an amount of, for example, 0% by mass to 20% by mass, preferably 1% by mass to 15% by mass, and more preferably 5% by mass to 10% by mass based on the total mass of a core material.

<Emulsion-Forming Step>

The formation of an emulsion refers to dispersing a liquid phase (dispersed phase), which does not dissolve in the solvent of the continuous phase of the present invention, in the continuous phase of the present invention as emulsion particles. The emulsification can be performed using a means commonly used for dispersing a dispersed phase and a continuous phase, for example, a general-purpose stirrer, a homogenizer, a Manton-Gaulin, an ultrasonic disperser, a dissolver, a Kady mill, or other known dispersing devices. In the formation of the emulsion (1), a material of a dispersed phase to form the emulsion particles (1) is dispersed in a continuous phase to form the emulsion (1). The emulsion-forming step can also be applied to the emulsion (2) of the present invention containing a compound (film-forming substance) polymerizable at the interface with the emulsion particles (1) in the emulsion (1).

The emulsion (2) of the present invention may be emulsified in a continuous phase using, as a dispersed phase (emulsion particles (2)), a film-forming monomer that reacts with each other to form a film or may be emulsified using, as a dispersed phase, an auxiliary solvent that does not dissolve in the solvent of the continuous phase but can dissolve the film-forming monomer. Examples of the auxiliary solvent include ketone-based compounds such as methyl ethyl ketone, ester-based compounds such as ethyl acetate, and alcohol-based compounds such as isopropyl alcohol.

The emulsion particles (2) in the emulsion (2) preferably have a solubility of 5% by weight or more relative to the emulsion particles (1) in the emulsion (1). The solubility is the solubility of the emulsion particles (2) in the emulsion particles (1), and when the solubility is high, a film (a shell of a microcapsule) is easily formed during the subsequent polymerization reaction (interfacial polymerization reaction). The solubility is just required to be 12% by weight or more, preferably 10% by weight or more, and more preferably 5% by weight or more, but the upper limit thereof is 88% by weight, preferably 90% by weight, and more preferably 95% by weight.

Specifically, for example, when ethylenediamine is used as a dispersed phase, polyvinylpyrrolidone is used as a dispersion stabilizer, and the dispersion stabilizer is dispersed in a continuous phase composed of a paraffin-based solvent at a prescribed stirring rate to form an emulsion. This serves as an emulsion (1). On the other hand, the emulsion (2) corresponding to this is formed by being dispersed in the same paraffin-based solvent as the polyisocyanate at a prescribed stirring rate. The particle size of the dispersed phase can be controlled by changing the stirring rate or by changing a stirring blade used. In another example, polyisocyanate is used as a dispersed phase, imidazole, which is a hydrophobic substance, is blended, and these are dispersed in a paraffin-based solvent at a prescribed stirring rate to form an emulsion (1). On the other hand, an emulsion (2) corresponding to this is formed by dispersing hexamethylenediamine as a dispersed phase at a prescribed stirring rate using a paraffinic solvent as a continuous phase to form an emulsion (2). In another example, when a bisphenol A type epoxy resin adduct (a curing agent or curing accelerator for an epoxy resin) is used as a core agent of emulsion particles (1) of an emulsion (1), imidazole and methyl ethyl ketone are first mixed with the bisphenol A type epoxy resin to form an adduct, and then the adduct is dispersed in a paraffin-based solvent at a prescribed stirring rate, whereby the resultant can be used as an emulsion (1). When this is used in place of the imidazole in the above-described emulsion (1) prepared using polyisocyanate and imidazole and is combined with an emulsion (2) formed from hexamethylenediamine, microcapsules in which the core of each microcapsule encapsulates an epoxy resin curing agent or curing accelerator can be formed.

<Microcapsule-Forming Step>

The microcapsule-forming step is a step of mixing the emulsions (1) and (2) formed as described above and having them undergo a polymerization reaction (interfacial polymerization reaction) to form a shell (a film) of microcapsules. The polymerization reaction is a step in which the emulsion particles (1) in the emulsion (1) and the emulsion particles (2) containing a film-forming substance contained in the emulsion (2) collide with each other and the emulsion particles (1) and the emulsion particles (2) are combined at the interface to start polymerization, whereby a shell (film) of a microcapsule is formed. The polymerization reaction is preferably performed under heating. The temperature of the polymerization reaction is usually 40° C. to 100° C., and preferably 50° C. to 80° C. As the polymerization reaction temperature is higher, the polymerization time is shorter, but when the reaction is faster, aggregation may easily occur. In that case, it is desirable to start the reaction at a relatively low temperature and then raise the temperature.

According to the study done by the present inventors, it has been found that when the solubility of the emulsion particles (2) relative to the emulsion particles (1) is 5% by weight or more, the emulsion particles (2) contained in the emulsion (2) at the time of producing microcapsules collide with the emulsion particles (1) contained in the emulsion (1) and are coalesced, so that the formation of the shell (film) tends to be promoted. There is no particular limitation as long as the combination has a solubility of 5% by weight or more. For example, in the case where an auxiliary solvent is used for the emulsion (2), diethyl ether, which has a solubility in water of 6.9%, ethyl acetate, which has a solubility of 8.3%, methyl ethyl ketone, acetone, and tetrahydrofuran, which have a solubility of 27.5%, can be used, and in the case where the emulsion particles (1) are of an imidazole compound, an amine highly soluble in imidazole, such as ethylene diamine and hexamethylene diamine, can be used singly for the emulsion (2).

In order to stably maintain the performance of the capsules of the present invention, it is desirable that the size of the capsules is uniform. For this purpose, the average particle size of the emulsion particles (1) of the emulsion (1) before and after the addition of the emulsion (2) of the present invention is preferably uniform, and the distribution of the average particle size is preferably less than 1.3 times the average particle size.

As a means for making the average particle size of the microcapsules of the present invention uniform, after the emulsion (1) is emulsified, the size of the emulsion particles (1) of the emulsion (1) is grown to a desired size, and then the emulsion (2) may be added. The above-described growth of the average particle size of the emulsion particles to a desired size is an increase in the droplet size due to the coalescence of the emulsion particles (1) of the emulsion (1), and a desired size of the emulsion particles (1) can be obtained by adjusting the shear force and the shear time accompanying the change in the viscosity of the continuous phase and the stirring rate.

The present inventors found that by maintaining a certain level of stirring rate after the formation of the emulsion (1), the dispersion value (standard deviation) in the distribution of the average particle size of the emulsion particles (1) does not extend beyond a certain level even when the average droplet size grows. As a result, it was found that even after the emulsion particles of both the emulsion (2) and the emulsion (1) are coalesced, the size of the diameter thereof is less than 1.3 times. That is, the increase rate of the average particle size (R) during the microcapsule-forming step is less than 1.3 times.

As to the preferred timing of the addition of the emulsion (2), it is preferable to add the emulsion (2) to start the coalescence when the increase in the dispersion value of the average particle size of the emulsion particles by stirring of the emulsion (1) reaches a plateau because the difference in sizes before and after the addition is reduced.

The average particle size (R) of the emulsion particles (1) composed of the emulsion (1) of the present invention is preferably 0.1 to 300 µm. When the average particle size of the emulsion particles (1) is less than 0.1 µm, aggregation of the emulsion particles (1) may occur and the reaction may be inhibited. When the average particle size of the emulsion particles (1) is more than 300 µm, microcapsules having a small particle size may not be produced. A preferable upper limit of the average particle size of the emulsion particles (1) is 100 µm, and a more preferable upper limit is 50 µm. The average particle size of the emulsion particles of the emulsion (1) and the emulsion (2) means the average particle size of droplets measured with a microscope or the like. However, when the average particle size of the emulsion particles is less than 1 µm, it means that the average particle size of droplets is determined with a particle size distribution analyzer or the like.

The average particle size (r) of the emulsion particles (2) composed of the emulsion (2) is preferably 10% or less of the average particle size (R) of the emulsion particles (1) composed of the emulsion (1) (that is, r/R≤0.1), specifically 0.01 to 30 µm, and preferably 0.01 to 10 µm. When the average particle size ratio (r/R) exceeds 0.1, the polymerization reaction of the emulsion particles (2) due to the coalescence with the emulsion particles (1) does not take priority, and the emulsion particles (1) or the emulsion particles (2) are coalesced, which affects the performance of the microcapsules themselves, which is unfavorable.

As the emulsion particles (2) of the emulsion (2) of the present invention, a common inkjet system may also be utilized. For example, the emulsion particles (2) of the present invention can be discharged through a piezoelectric inkjet nozzle and coalesced with the emulsion particles (1).

The emulsion-forming step of the present invention is suitable for either an O/W type or a W/O type, but in order to keep the emulsion particles (2) of the emulsion (2) stable, O/O' is preferable, and O' is desirably higher in viscosity than water. When the viscosity is high, the coalescence of the emulsion particles (2) can be inhibited and the coalescence of the emulsion particles (1) and (2) is promoted. In addition, as the interfacial tension of the emulsion (2) is higher, it is preferable because deformation is less likely to occur, and the emulsion (2) is easy to coalesce with the emulsion particles (1) of the emulsion (1).

Regarding the solvent of the oil phase, when an aliphatic hydrocarbon-based solvent is used, the larger the number of carbon atoms is, the more preferable it is because the droplets are stabilized.

The film (shell) of the microcapsules in the present invention preferably comprises polyurethane or polyurea derived from the structure of polyisocyanate.

The average shell (film) thickness of the microcapsules of the present invention preferably has a lower limit of 0.01 µm and preferably has an upper limit of 5.0 µm. When the average shell thickness is less than 0.01 µm, the retention of the core agent may be deteriorated. When the average shell thickness is more than 5.0 µm, the releasability of a water-soluble core agent may be deteriorated. The lower limit of the average shell thickness is more preferably 0.08 µm, and the upper limit is more preferably 1.0 µm.

The average shell thickness refers to an average value obtained by averaging the individual wall thicknesses (µm) of 10 microcapsules measured with a scanning electron microscope (SEM). Specifically, a microcapsule liquid is applied onto an arbitrary support and dried to form a coating film. The average wall thickness is determined by preparing a cross-sectional section of the coating film obtained, observing the cross section using an SEM, choosing arbitrary 10 microcapsules, observing the cross section of each of the microcapsules, measuring the wall thickness, and calculating the average value.

The polymerization reaction time for forming the microcapsules of the present invention is usually preferably about 0.5 hours to about 10 hours, and more preferably about 1 hour to about 6 hours. Reducing r/R as described above can make the reaction time within 4 hours, which is preferable from the viewpoint of productivity. The polymerization reaction time as used herein refers to a time from the completion of the addition of the emulsion (2) to the emulsion (1) to the start of the washing to be described later.

An excessively short polymerization reaction time means the end of the reaction in a state where unreacted components remain or sufficient film strength cannot be obtained. On the other hand, an excessively long reaction time may result in addition of an unnecessary reaction at other than the interface, which sometimes leads to unevenness between microcapsules or aggregation of microcapsules.

The resulting microcapsules may be coated, as necessary. The method for coating the microcapsules is not particularly limited, and examples thereof include interfacial polymerization with, for example, a substance that reacts with the film-forming material of the capsules. When the film-forming material is locally present on the surface of particles, it becomes possible to coat the surface of the capsules, in the same manner as the addition of the emulsion (2) of the present invention, by once performing the emulsification of the continuous phase and the substance that reacts with the film-forming material, and then adding the emulsified liquid composed of droplets comprising the substance that reacts with the film-forming material to a reaction liquid. It is preferable to coat the microcapsules from the viewpoint of preventing leakage of the core agent of the microcapsules. The amount of the substance that reacts with the film-forming product is equal to or less than the equivalent of the film-forming material contained in the emulsion (2), and preferably ¹⁄₁₀ or less. For example, examples of a substance that reacts with an amine that is a film-forming material include an epoxy compound, and the amount thereof is equal to or less than the equivalent, preferably equal to or less than ¹⁄₁₀ equivalent, and more preferably equal to or less than ¹⁄₅₀ equivalent based on the hydrogen equivalent of the amine. The above-mentioned epoxy compound may be used singly or two or more thereof may be used in combination. As to the timing when the emulsion composed of the droplets comprising the substance that reacts with the film-forming material is added to the reaction liquid, the emulsion may be added arbitrarily during the time from the end of the addition of the emulsion (2) of the present invention to the end of the reaction. As a preferable timing of the addition, the addition is desirably performed 1 hour before the end of the reaction, and more preferably 30 minutes before the end of the reaction, from the viewpoint that a film has been formed.

The microcapsules obtained may be repeatedly washed with a solvent such as water, hexane, toluene, or ethyl acetate, and then dried by vacuum drying or the like.

The microcapsules of the present invention have an average particle size of the final microcapsules of 0.1 to 4000 μm, preferably 0.1 to 350 μm, more preferably 0.1 to 310 μm. Production of capsules smaller than 0.1 μm affords a reduced amount of the core agent. Microcapsules larger than 400 μm can also be made, but the advantages of using the production method of the present invention are reduced. The microcapsules of the present invention can be used for many core agents and can be used for various applications.

EXAMPLES

In the following, the present invention will be described in more detail with reference to Examples, but the present invention is not limited to these Examples.

<Preparation of Microcapsules Enclosing Aqueous Solution>

Example 1

Ethylenediamine (manufactured by FUJIFILM Wako Pure Chemical Corporation) (2 parts by weight) as a monomer for forming a film and a 10% aqueous polyvinylpyrrolidone solution (30 parts by weight) as a water-soluble core agent were mixed and dissolved, to obtain solution (1). This solution (1) was added to 120 parts by weight of a paraffin-based solvent (MORESCO-WHITE P-100 manufactured by MORESCO Corporation) (containing 5% by weight of SUNSOFT 818R (manufactured by Taiyo Kagaku Co., Ltd.) as an emulsifier), and the mixture was stirred at 550 rpm using a stirrer to prepare an emulsion (1) in which emulsion particles (1) were dispersed. A droplet size (average particle size) of the emulsion particles (1) was measured with a microscope (VHX-6000 manufactured by KEYENCE CORPORATION) and found to be 101.5 μm.

On the other hand, 30 parts by weight of STABiO D-370N (manufactured by Mitsui Chemicals, Inc.) as a polyisocyanate that reacts with ethylenediamine to form a film was dissolved in 30 parts by weight of ethyl acetate, and added to 600 parts by weight of a paraffin-based solvent (MORESCO-WHITE P-100 manufactured by MORESCO Corporation) (containing 7% by weight of SUNSOFT 818R (manufactured by Taiyo Kagaku Co., Ltd.) as an emulsifier). The mixture was stirred at 10,000 rpm using a homomixer (MARK II manufactured by PRIMIX Corporation) to prepare an emulsion (2) in which emulsion particles (2) were dispersed. A droplet size (average particle size) of the emulsion particles (2) was measured with a microscope (VHX-6000 manufactured by KEYENCE CORPORATION) and found to be 10.1 μm.

The emulsion (1) obtained was charged into a jacketed stirred reaction vessel, and then the emulsion (2) was added during stirring at 250 rpm. Thereafter, the mixture was stirred at room temperature for 60 minutes, then warm water was passed through the jacket such that the reaction solution was brought to 50° C., and the mixture was reacted at 50° C. for 240 minutes. After completion of the reaction, the reaction solution was charged into toluene in an amount twice the amount of the reaction solution, and then microcapsules were obtained by suction filtration. The particle size (average particle size) of the microcapsules was measured with a microscope (VHX-6000 manufactured by KEYENCE CORPORATION) and found to be 103.8 μm.

The solubility of the emulsion particles (2) in the emulsion particles (1) was 8.3.

The moisture content of the microcapsules was measured using an infrared moisture analyzer (FD-720 manufactured by Kett Electric Laboratory Co., Ltd.), and the water content rate of the microcapsules was determined to be 62.0%.

Example 2

An emulsion (2) in which emulsion particles (2) were dispersed was prepared in the same manner as in Example 1 except that the rotation speed using the homomixer (MARK II manufactured by PRIMIX Corporation) was changed to 15000 rpm. A droplet size (average particle size) of the emulsion particles (2) was measured with a microscope (VHX-6000 manufactured by KEYENCE CORPORATION) and found to be 4.8 μm.

Microcapsules were obtained in the same manner as in Example 1 except that an emulsion (2) was added to an emulsion (1) in the same manner as in Example 1, then the mixture was stirred at room temperature for 60 minutes, then warm water was passed through the jacket such that the reaction solution was brought to 50° C., and the mixture was reacted at 50° C. for 150 minutes. The particle size (average particle size) of the microcapsules was measured with a microscope (VHX-6000 manufactured by KEYENCE CORPORATION) and found to be 102.8 μm.

The solubility of the emulsion particles (2) in the emulsion particles (1) was 8.3.

The moisture content of the microcapsules was measured using an infrared moisture analyzer (FD-720 manufactured by Kett Electric Laboratory Co., Ltd.), and the water content rate of the microcapsules was determined to be 63.0%.

Example 3

An emulsion (1) was prepared in the same manner as in Example 1 except that the rotation speed of stirring was changed to 250 rpm. A droplet size (average particle size) of the emulsion particles (1) was measured with a microscope (VHX-6000 manufactured by KEYENCE CORPORATION) and found to be 200.7 μm.

Microcapsules were obtained in the same manner as in Example 1 except that an emulsion (1) was charged to a jacketed stirred reaction vessel in the same manner as in Example 1, then the emulsion (2) of Example 1 was added during stirring at 150 rpm, then the mixture was stirred at room temperature for 60 minutes, then warm water was passed through the jacket such that the reaction solution was brought to 50° C., and the mixture was reacted at 50° C. for 180 minutes. The particle size (average particle size) of the microcapsules was measured with a microscope (VHX-6000 manufactured by KEYENCE CORPORATION) and found to be 205.3 μm.

The solubility of the emulsion particles (2) in the emulsion particles (1) was 8.3.

The moisture content of the microcapsules was measured using an infrared moisture analyzer (FD-720 manufactured by Kett Electric Laboratory Co., Ltd.), and the water content rate of the microcapsules was determined to be 61.0%.

Example 4

An emulsion (2) in which emulsion particles (2) were dispersed was prepared in the same manner as in Example 3 except that the rotation speed using the homomixer (MARK II manufactured by PRIMIX Corporation) was changed to 5000 rpm in the preparation of the emulsion (2). A droplet size (average particle size) of the emulsion particles (2) was measured with a microscope (VHX-6000 manufactured by KEYENCE CORPORATION) and found to be 20.0 μm.

Microcapsules were obtained in the same manner as in Example 3 except that an emulsion (2) was added to an emulsion (1) in the same manner as in Example 3, then the mixture was stirred at room temperature for 60 minutes, then warm water was passed through the jacket such that the reaction solution was brought to 50° C., and the mixture was reacted at 50° C. for 300 minutes. The particle size (average particle size) of the microcapsules was measured with a microscope (VHX-6000 manufactured by KEYENCE CORPORATION) and found to be 210.0 μm.

The solubility of the emulsion particles (2) in the emulsion particles (1) was 8.3.

The moisture content of the microcapsules was measured using an infrared moisture analyzer (FD-720 manufactured by Kett Electric Laboratory Co., Ltd.), and the water content rate of the microcapsules was determined to be 60.0%.

Example 5

An emulsion (2) was prepared in the same manner as in Example 1 except that in the preparation of a solution (1), ethylenediamine was changed to 2 parts by weight of 1,4-butanediol (manufactured by FUJIFILM Wako Pure Chemical Corporation), and in the preparation of a solution (2), 1.5 parts by weight of 1,4-diazabicyclo[2.2.2]octane (manufactured by FUJIFILM Wako Pure Chemical Corporation) as a catalyst was added to a solution composed of 30 parts by weight of STABiO D-370N (manufactured by Mitsui Chemicals, Inc.) and 30 parts by weight of ethyl acetate.

A droplet size (average droplet size) of the droplets made of the solution (1) was measured with a microscope (VHX-6000 manufactured by KEYENCE CORPORATION) and found to be 103.0 μm. On the other hand, a droplet size (average droplet size) of the droplets made of the solution (2) was measured with a microscope (VHX-6000 manufactured by KEYENCE CORPORATION) and found to be 10.2 μm. A particle size (average particle size) of the microcapsules obtained was measured with a microscope (VHX-6000 manufactured by KEYENCE CORPORATION) and found to be 105.4 μm.

The moisture content of the microcapsules was measured using an infrared moisture analyzer (FD-720 manufactured by Kett Electric Laboratory Co., Ltd.), and the water content rate of the microcapsules was determined to be 65.0%.

Comparative Example 1

In the same manner as in Example 1, in the preparation of an emulsion (2), 30 parts by weight of STABiO D-370N (manufactured by Mitsui Chemicals, Inc.) was added directly to a jacketed stirred reaction vessel charged with an emulsion (1). Although the reaction was performed by stirring at room temperature and stirring at 50° C. for 8 hours in total, an emulsion (2) was not formed, so that a film was not formed and microcapsules could not be obtained.

Comparative Example 2

In the same manner as in Example 1, in the preparation of an emulsion (2), 30 parts by weight of STABiO D-370N (manufactured by Mitsui Chemicals, Inc.) was added to 600 parts by weight of a paraffin-based solvent (MORESCO-WHITE P-100 manufactured by MORESCO Corporation) (containing 7% by weight of SUNSOFT 818R (manufactured by Taiyo Kagaku Co., Ltd.) as an emulsifier) without being dissolved in ethyl acetate, and the mixture was stirred at 10000 rpm using a homomixer (MARK II manufactured by PRIMIX Corporation), and thus an emulsion (2) in which emulsion particles (2) were dispersed was prepared. A droplet size (average particle size) of the emulsion particles (2) was measured with a microscope (VHX-6000 manufactured by KEYENCE CORPORATION) and found to be 27.3 μm. r/R was 0.269.

After the emulsion (1) obtained was charged into a jacketed stirred reaction vessel, the emulsion (2) was added during stirring at 250 rpm, and then particles were aggregated during the reaction, so that dispersion could not be performed and microcapsules could not be obtained.

Comparative Example 3

In the same manner as in Example 1, in the preparation of an emulsion (2), 30 parts by weight of STABiO D-370N (manufactured by Mitsui Chemicals, Inc.) was added to 600 parts by weight of a paraffin-based solvent (MORESCO-WHITE P-100 manufactured by MORESCO Corporation) (containing 7% by weight of SUNSOFT 818R (manufactured by Taiyo Kagaku Co., Ltd.) as an emulsifier) without being dissolved in ethyl acetate, and the mixture was stirred at 15000 rpm using a homomixer (MARK II manufactured by PRIMIX Corporation), and thus an emulsion (2) in which emulsion particles (2) were dispersed was prepared. A droplet size (average particle size) of the emulsion particles (2) was measured with a microscope (VHX-6000 manufactured by KEYENCE CORPORATION) and found to be 9.8 µm.

The emulsion (1) obtained was charged into a jacketed stirred reaction vessel, and then the emulsion (2) was added during stirring at 250 rpm. Thereafter, the mixture was stirred at room temperature for 60 minutes, then warm water was passed through the jacket such that the reaction solution was brought to 50° C., and the mixture was reacted at 50° C. Sampling was performed during the reaction, and the result showed that the film was 101.5 µm thick but was weak, and the reaction was carried out by stirring at room temperature and stirring at 50° C. for 8 hours in total. After the reaction solution was charged into toluene in an amount twice the amount of the reaction solution, microcapsules were crushed at the time of suction filtration, forming aggregates, so that microcapsules were not obtained.

Comparative Example 4

In the same manner as in Example 1, in the preparation of an emulsion (2), 30 parts by weight of STABiO D-370N (manufactured by Mitsui Chemicals, Inc.) was dissolved in 30 parts by weight of ethyl acetate and added to 600 parts by weight of a paraffin-based solvent (MORESCO-WHITE P-100 manufactured by MORESCO Corporation) (containing 7% by weight of SUNSOFT 818R (manufactured by Taiyo Kagaku Co., Ltd.) as an emulsifier), and the mixture was stirred at 5000 rpm using a homomixer (MARK II manufactured by PRIMIX Corporation), and thus an emulsion (2) in which emulsion particles (2) were dispersed was prepared. A droplet size (average particle size) of the emulsion particles (2) was measured with a microscope (VHX-6000 manufactured by KEYENCE CORPORATION) and found to be 31.3 µm. The value of r/R was 0.3084.

The emulsion (1) obtained was charged into a jacketed stirred reaction vessel, and then the emulsion (2) was added during stirring at 250 rpm. Thereafter, the mixture was stirred at room temperature for 60 minutes, then warm water was passed through the jacket such that the reaction solution was brought to 50° C., and the mixture was reacted at 50° C. for 180 minutes. After completion of the reaction, the reaction solution was charged into toluene in an amount twice the amount of the reaction solution, and then microcapsules were obtained by suction filtration. The particle size (average particle size) of the microcapsules was measured with a microscope (VHX-6000 manufactured by KEYENCE CORPORATION) to be 130.3 µm, but the water encapsulated in the microcapsules had leaked. The moisture content of the microcapsules was measured with an infrared moisture analyzer (FD-720 manufactured by Kett Electric Laboratory Co., Ltd.), and the water content rate of the microcapsules was determined to be 25.0%.

<Preparation of Microcapsules Encapsulating Hydrophobic Substance>

Example 6

STABiO D-370N (manufactured by Mitsui Chemicals, Inc.) (10 parts by weight) as a polyisocyanate, TAKENATE D-262 (manufactured by Mitsui Chemicals, Inc.) (3 parts by weight), and hydrophobic substance 1-benzyl-2-methylimidazole (32 parts by weight) were mixed and dissolved, to obtain a solution (1). This solution (1) was added to 300 parts by weight of a paraffin-based solvent (MORESCO-WHITE P-100 manufactured by MORESCO Corporation) (containing 0.5% by weight of KF-6038 (manufactured by Shin-Etsu Chemical Co., Ltd.) as an emulsifier), and the mixture was stirred at 4500 rpm using a homomixer (MARK II manufactured by PRIMIX Corporation) to prepare an emulsion (1) in which emulsion particles (1) were dispersed. A droplet size (average particle size) of the emulsion particles (1) was measured with a microscope (VHX-6000 manufactured by KEYENCE CORPORATION) and found to be 15.1 µm.

On the other hand, 4 parts by weight of hexamethylenediamine (manufactured by FUJIFILM Wako Pure Chemical Corporation) was added to 300 parts by weight of a paraffin-based solvent (MORESCO-WHITE P-100 manufactured by MORESCO Corporation) (containing 0.5% by weight of KF-6038 (manufactured by Shin-Etsu Chemical Co., Ltd.) as an emulsifier), and the mixture was stirred at 8000 rpm using a homomixer (MARK II manufactured by PRIMIX Corporation) to prepare an emulsion (2) in which emulsion particles (2) were dispersed. A droplet size (average particle size) of the emulsion particles (2) was measured with a microscope (VHX-6000 manufactured by KEYENCE CORPORATION) and found to be 1.5 µm.

The emulsion (1) obtained was charged into a jacketed stirred reaction vessel, and then the emulsion (2) was rapidly added during stirring at 250 rpm. Thereafter, the mixture was stirred at room temperature for 60 minutes, then warm water was passed through the jacket such that the reaction solution was brought to 50° C., and the mixture was reacted at 50° C. for 150 minutes. After completion of the reaction, the reaction solution was charged into hexane in an amount twice the amount of the reaction solution, and then microcapsules were obtained by suction filtration. The particle size (average particle size) of the microcapsules was measured with a microscope (VHX-6000 manufactured by KEYENCE CORPORATION) and found to be 15.8 µm.

Example 7

Microcapsules were obtained by doing the following change in Example 6.

Microcapsules were obtained in the same manner as in Example 2 except that the emulsion (1) was charged into a jacketed stirred reaction vessel, then stirred at 250 rpm for 90 minutes, and then the emulsion (2) was added. When the emulsion (2) was added, the emulsion (1) was charged into a jacketed stirred reaction vessel, and then the average particle size was measured every 10 minutes. It was confirmed that the dispersion value (standard deviation) did not spread and a droplet size (average particle size) was 19.2 µm, and then, the emulsion (2) was added.

After completion of the reaction, the particle size (average particle size) of the microcapsules was measured with a microscope (VHX-6000 manufactured by KEYENCE CORPORATION) and found to be 19.8 µm.

Example 8

Microcapsules were obtained by doing the following change in Example 6.

In the preparation of the emulsion (1), the rotation speed was changed to 400 rpm using a Three-One Motor instead of stirring at 4500 rpm using a homomixer (MARK II manufactured by PRIMIX Corporation) to prepare an emulsion (1) in which emulsion particles (1) were dispersed. A droplet size (average particle size) of the emulsion particles (1) was measured with a microscope (VHX-6000 manufactured by KEYENCE CORPORATION) and found to be 98.5 μm.

Next, microcapsules were obtained in the same manner as in Example 6 except that in the preparation of the emulsion (2) in Example 6, the rotation speed using a homomixer (MARK II manufactured by PRIMIX Corporation) was changed to 2000 rpm and an emulsion (2) in which emulsion particles (2) were dispersed was prepared. In addition, a droplet size (average particle size) of the emulsion particles (2) was measured with a microscope (VHX-6000 manufactured by KEYENCE CORPORATION) and found to be 7.8 μm.

After completion of the reaction, the particle size (average particle size) of the microcapsules was measured with a microscope (VHX-6000 manufactured by KEYENCE CORPORATION) and found to be 105.0 μm.

Comparative Example 5

In the preparation of the emulsion (2) of Example 6, the mixture was stirred at 4000 rpm using a homomixer (MARK II manufactured by PRIMIX Corporation) to prepare an emulsion (2) in which emulsion particles (2) were dispersed. A droplet size (average particle size) of the emulsion particles (2) was measured with a microscope (VHX-6000 manufactured by KEYENCE CORPORATION) and found to be 3.0 μm. A reaction was carried out in the same manner as in Example 6, to obtain microcapsules. The value of r/R was 0.1987.

The particle size (average particle size) of the microcapsules was measured with a microscope (VHX-6000 manufactured by KEYENCE CORPORATION) and found to be 22.0 μm.

<Evaluation>
Hardness Test (Pressure Resistance)

The pressure resistance of the microcapsules obtained in Example 6, Example 7, Example 8, and Comparative Example 5 was evaluated as follows using a commercially available oil blotting paper.

An oil blotting paper was also placed on the upper side of the microcapsules placed on the commercially available oil blotting paper. Then, when the pushing pressure was lowered from 45 N in the hardness mode of the small desktop tester Eztest (manufactured by Shimadzu Corporation), the pressure at which the hydrophobic substance encapsulated in the microcapsules oozed out from the oil blotting paper and absorbed by the oil blotting paper (leakage was sensed) was ascertained, and the pressure at which the oozing was not sensed was obtained (described as pressure resistance). The results are shown in Table 1.

TABLE 1

|  | Example 5 | Example 6 | Example 7 | Comparative Example 5 |
|---|---|---|---|---|
| Pressure resistance/N | 30 | 30 | 20 | 5 |

It has been found that the microcapsules of the present invention have superior resistance at the time of pressurization because the individual particles are uniform, so that the encapsulant hardly leaks out by pressurization.

<Preparation in Microcapsules Encapsulating Adduct of Epoxy Resin>

Example 9

Preparation of Adduct A

1-Benzyl-2-methylimidazole (17.2 parts by weight), a bisphenol A type epoxy resin (jER828 manufactured by Mitsubishi Chemical Corporation) (6.33 parts by weight), and methyl ethyl ketone (20 ml) were stirred at 30° C. for 1 hour or more to prepare an adduct A.

Microcapsules were obtained in the same manner as in Example 6 except that the hydrophobic substance 1-benzyl-2-methylimidazole was changed to 32 parts by weight of the adduct in Example 6. The particle size R of the emulsion particles (1) was 15.1 μm, and the particle size r of the emulsion particles (2) was 1.5 μm. Therefore, the value of r/R was 0.0993.

Example 10

<Production of Adduct B>

2-Methylimidazole (5.80 parts by weight), a bisphenol A type epoxy resin (jER828 manufactured by Mitsubishi Chemical Corporation) (4.47 parts by weight), and methyl ethyl ketone (80 ml) were stirred at 30° C. for 1 hour or more, and then the mixture was returned to room temperature to prepare an adduct B.

Microcapsules were obtained in the same manner as in Example 6 except that the hydrophobic substance 1-benzyl-2-methylimidazole was changed to 32 parts by weight of the adduct B in Example 6. The particle size R of the emulsion particles (1) was 15.1 μm, and the particle sizer of the emulsion particles (2) was 1.3 μm. Therefore, the value of r/R was 0.0861.

Example 11

<Production of Adduct C>

2-Phenylimidazole (10.2 parts by weight), a bisphenol A type epoxy resin (jER828 manufactured by Mitsubishi Chemical Corporation) (4.47 parts by weight), and methyl ethyl ketone (80 ml) were stirred at 30° C. for 1 hour or more, and then the mixture was returned to room temperature to prepare an adduct C.

Microcapsules were obtained in the same manner as in Example 6 except that the hydrophobic substance 1-benzyl-2-methylimidazole was changed to 32 parts by weight of the adduct C in Example 6. The particle size R of the emulsion particles (1) was 15.1 μm, and the particle size r of the emulsion particles (2) was 1.4 μm. Therefore, the value of r/R was 0.0927.

It has been found that the microcapsules of the present invention are superior in storage stability to a curing agent used alone due to microencapsulation, and the storage stability is significantly improved by using an epoxy resin adduct as an encapsulant.

Table 2 below shows the particle size (R μm) of the emulsion (1), the particle size (r μm) of the emulsion (2), the value of r/R, the solubility (%) of the emulsion particles (2) in the emulsion particles (1), the particle size (μm) of the microcapsules obtained, and the moisture content (%) of the microcapsules obtained in Examples and Comparative Examples.

TABLE 2

|  | r (μm) | R (μm) | r/R | Solubility (%) | Capsule particle size (μm) | Moisture content (%) |
|---|---|---|---|---|---|---|
| Example 1 | 10.1 | 101.5 | 0.0995 | 8.3 | 103.8 | 62 |
| Example 2 | 4.8 | 101.5 | 0.0473 | 8.3 | 102.8 | 63 |
| Example 3 | 10.1 | 200.7 | 0.0503 | 8.3 | 205.3 | 61 |
| Example 4 | 20.0 | 200.7 | 0.0997 | 8.3 | 210.0 | 60 |
| Example 5 | 10.2 | 103.0 | 0.099 | 8.3 | 105.4 | 65 |
| Example 6 | 1.5 | 15.1 | 0.0993 | >10 | 15.8 |  |
| Example 7 | 1.5 | 19.2 | 0.0781 | >10 | 20.8 |  |
| Example 8 | 7.8 | 98.5 | 0.0792 | >10 | 105.0 |  |
| Example 9 | 1.5 | 15.1 | 0.0993 | >10 | 17.2 |  |
| Example 10 | 1.3 | 15.1 | 0.0861 | >10 | 17.0 |  |
| Example 11 | 1.4 | 15.1 | 0.0927 | >10 | 17.5 |  |
| Comparative Example 1 | — | 101.5 | — | — | — | — |
| Comparative Example 2 | 27.3 | 101.5 | 0.269 | — | — | — |
| Comparative Example 3 | 9.8 | 101.5 | 0.0966 | — | — | — |
| Comparative Example 4 | 31.3 | 101.5 | 0.3084 | 8.3 | 130.3 | 25 |
| Comparative Example 5 | 3.0 | 15.1 | 0.1987 | >10 | 22.0 |  |

The invention claimed is:

1. A method for producing microcapsules using two types of emulsion particles differing in size, the method comprising:
   an emulsion-forming step of separately forming two types of emulsions (1) and (2) whose continuous phases are common, wherein emulsion particles (1) of the emulsion (1) comprises one of two types of monomers which react with each other to form a film and emulsion particles (2) of the emulsion (2) comprises the other monomer; and
   a microcapsule-forming step of mixing and interfacial-polymerizing the emulsion (1) and the emulsion (2), wherein
   the emulsion particles (1) of the emulsion (1) have an average particle size (R) of 0.1 to 300 μm,
   the emulsion particles (2) of the emulsion (2) have an average particle size (r) of 0.01 to 30 μm, and r/R≤0.1 is satisfied, and
   the microcapsule-forming step has a reaction time of 6 hours or less.

2. The method for producing microcapsules according to claim 1, wherein the emulsion particles (1) have an average particle size (R) of 0.1 to 100 μm, the emulsion particles (2) have an average particle size (r) of 0.01 to 10 μm, and r/R≤0.1 is satisfied.

3. The method for producing microcapsules according to claim 1, wherein the average particle size (R) of the emulsion particles (1) or the average particle size (r) of the emulsion particles (2) is adjusted into a prescribed range, after the emulsion-forming step.

4. The method for producing microcapsules according to claim 1, wherein an increase rate of the average particle size (R) during the microcapsule-forming step is less than 1.3 times.

5. The method for producing microcapsules according to claim 1, wherein the continuous phase is liquid paraffin or silicone oil.

6. The method for producing microcapsules according to claim 1, wherein one of two types of monomers that react with each other to form a film is an isocyanate compound having two or more isocyanate groups in one molecule, and the other monomer is a monomer selected from the group consisting of a polyamine compound having two or more amino groups in one molecule, a polyhydroxy compound having two or more hydroxyl groups in one molecule, and a combination thereof.

7. The method for producing microcapsules according to claim 1, wherein a core agent of the microcapsules is water, a water-soluble heat storage material, a thermally expandable hydrocarbon or a fluoride thereof, an epoxy resin curing agent, or an epoxy resin curing accelerator.

8. The method for producing microcapsules according to claim 7, wherein the epoxy resin curing agent comprises a polyisocyanate, a bisphenol A type epoxy resin, and an imidazole compound.

9. The method for producing microcapsules according to claim 7, wherein the epoxy resin curing agent is a liquid mixture prepared by mixing a polyisocyanate, a bisphenol A type epoxy resin, and an imidazole compound in advance and then heating and stirring the mixture.

* * * * *